United States Patent
Du et al.

(10) Patent No.: US 9,252,919 B2
(45) Date of Patent: Feb. 2, 2016

(54) METHOD AND DEVICE FOR DEMODULATING RELIABLE AND RESIDUAL DATA

(71) Applicant: Huawei Technologies Co., Ltd., Shenzhen, Guangdong (CN)

(72) Inventors: Yinggang Du, Kista (SE); Sheng Liu, Shenzhen (CN); Rui Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/540,878

(22) Filed: Nov. 13, 2014

(65) Prior Publication Data

US 2015/0071337 A1    Mar. 12, 2015

Related U.S. Application Data

(63) Continuation of application No. PCT/CN2012/083222, filed on Oct. 19, 2012.

(30) Foreign Application Priority Data

May 14, 2012    (CN) .......................... 2012 1 0147541

(51) Int. Cl.
*H04L 1/00* (2006.01)
*H04L 27/38* (2006.01)
(Continued)

(52) U.S. Cl.
CPC ............ *H04L 1/0054* (2013.01); *H04B 1/1027* (2013.01); *H04L 25/03216* (2013.01);
(Continued)

(58) Field of Classification Search
CPC ................ H04B 1/1027; H04L 1/0054; H04L 2025/03426; H04L 27/2649; H04L 27/38; H04L 25/03216; H04L 2025/0342
See application file for complete search history.

(56) References Cited

U.S. PATENT DOCUMENTS

| | | | | |
|---|---|---|---|---|
| 4,713,817 A | * | 12/1987 | Wei | ........................ H03M 13/25 375/244 |
| 5,565,926 A | * | 10/1996 | Bryan | .................... H04L 25/497 348/E5.108 |

(Continued)

FOREIGN PATENT DOCUMENTS

| | | |
|---|---|---|
| CN | 1806408 A | 7/2006 |
| CN | 101040540 A | 9/2007 |

(Continued)

OTHER PUBLICATIONS

Xiaodong Li, et al., "Reduced-Complexity Detection Algorithms for Systems Using Multi-Element Arrays", IEEE Global Telecommunications Conference, Nov. 27, 2000, p. 1072-1076.

(Continued)

*Primary Examiner* — Sophia Vlahos

(57) ABSTRACT

Embodiments of the present invention provide a method and device for demodulating data. The method includes: determining a number of reliable bits of each path of data in M paths of data and a modulation manner used to demodulate the reliable bits of each path of data, where M is a positive integer; demodulating the reliable bits of each path of data according to the modulation manner used to demodulate the reliable bits of each path of data; and demodulating residual bits in each path of data except the reliable bits according to a maximal likelihood ML algorithm. Compared with the prior art, it is unnecessary to demodulate all bits of each path of data according to the ML algorithm, thereby lowering the complexity of demodulation by using the ML algorithm.

26 Claims, 4 Drawing Sheets

(51) Int. Cl.
*H04B 1/10* (2006.01)
*H04L 25/03* (2006.01)
*H04L 27/26* (2006.01)

(52) U.S. Cl.
CPC ............. *H04L27/38* (2013.01); *H04L 27/2649* (2013.01); *H04L 2025/0342* (2013.01); *H04L 2025/03426* (2013.01)

(56) References Cited

U.S. PATENT DOCUMENTS

| | | | | |
|---|---|---|---|---|
| 6,141,391 | A * | 10/2000 | Morelos-Zaragoza | H04L 1/0036 375/262 |
| 2003/0043928 | A1 * | 3/2003 | Ling | H04B 7/0417 375/267 |
| 2005/0141644 | A1 | 6/2005 | Sadowsky | |
| 2005/0243943 | A1 | 11/2005 | Stirling-Gallacher | |
| 2006/0056550 | A1 | 3/2006 | Skraparlis et al. | |
| 2011/0003561 | A1 * | 1/2011 | Miao | H04W 52/12 455/69 |
| 2011/0142153 | A1 | 6/2011 | Yoon et al. | |

FOREIGN PATENT DOCUMENTS

| | | |
|---|---|---|
| CN | 101453444 A | 6/2009 |
| CN | 101547058 A | 9/2009 |
| CN | 101582748 A | 11/2009 |
| EP | 1 515 469 A2 | 3/2005 |
| JP | 4269858 B2 | 5/2009 |

OTHER PUBLICATIONS

Junqiang Li, et al., "Multi-Stage Low Complexity Maximum Likelihood Detection for OFDM/SDMA Wireless LANs", IEEE International Conference on Communications, Jun. 11, 2001, p. 1152-1156.

* cited by examiner

Transmitting antenna        Receiving antenna

METHOD AND DEVICE FOR DEMODULATING RELIABLE AND RESIDUAL DATA

CROSS-REFERENCE TO RELATED APPLICATIONS

This application is a continuation of International Application No. PCT/CN2012/083222, filed on Oct. 19, 2012, which claims priority to Chinese Patent Application No. 201210147541.8, filed on May 14, 2012, both of which are hereby incorporated by reference in their entireties.

TECHNICAL FIELD

The present invention relates to the field of communications, and in particular, to a method and device for demodulating data.

BACKGROUND

In a scenario of MIMO (Multiple-Input and Multiple-Output, multiple-input and multiple-output), detecting demodulation by using ML (Maximal Likelihood, maximal likelihood) may enable a system to have optimal bit error rate performance, thereby gaining wide application. The complexity of the ML algorithm usually increases exponentially along with the total number of streams of the MIMO and a modulation order, so in the existing wireless communication system standard protocol, commonly a low-order modulation manner is adopted. Because once higher-order modulation is adopted, the complexity of detecting the demodulation by using the ML is almost unacceptable.

However, in another aspect, as the cellular is becoming smaller, and the interference management technology develops, the higher-order modulation manner may be increasingly applied in a cellular network or other wireless networks. Therefore, the problem of the complexity of detecting the demodulation by using the ML algorithm may become more prominent.

SUMMARY

Embodiments of the present invention provide a method and device for demodulating data, which can lower the complexity of demodulation by using an ML algorithm.

In one aspect, a method for demodulating data is provided, which includes: determining the number of reliable bits of each path of data in M paths of data and a modulation manner used to demodulate the reliable bits of each path of data, where M is a positive integer; demodulating the reliable bits of each path of data according to the modulation manner used to demodulate the reliable bits of each path of data; and demodulating residual bits in each path of data except the reliable bits according to a maximal likelihood ML algorithm.

In another aspect, a device for demodulating data is provided, which includes: a determining unit, configured to determine the number of reliable bits of each path of data in M paths of data, and determine a modulation manner used to demodulate the reliable bits of each path of data, where the M is a positive integer; a first demodulation unit, configured to demodulate the reliable bits of each path of data according to the modulation manner used to demodulate the reliable bits of each path of data; and a second demodulation unit, configured to demodulate residual bits in each path of data except the reliable bits according to a maximal likelihood ML algorithm.

In the embodiments of the present invention, the number of the reliable bits of each path of data and the modulation manner used to demodulate the reliable bits of each path of data are determined, and the residual bits in each path of data except the reliable bits are demodulated according to the ML algorithm; therefore, compared with the prior art, it is unnecessary to demodulate all bits of each path of data according to the ML algorithm, thereby lowering the complexity of demodulation by using the ML algorithm.

BRIEF DESCRIPTION OF THE DRAWINGS

To describe the technical solutions in the embodiments of the present invention more clearly, the following briefly introduces the accompanying drawing needed for describing the embodiments of the present invention. Apparently, the accompanying drawing in the following description show merely some embodiments of the present invention and a person of ordinary skill in the art may still derive other drawings from the accompanying drawing without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments in the present invention without creative efforts shall fall within the protection scope of the present invention.

A technical solution of the present invention may be applied in various communication systems, such as a global system of mobile communication (GSM, Global System of Mobile communication), a code division multiple access (CDMA, Code Division Multiple Access) system, wideband code division multiple access wireless (WCDMA, Wideband Code Division Multiple Access Wireless), general packet radio service (GPRS, General Packet Radio Service) and long term evolution (LTE, Long Term Evolution).

Figure 1:
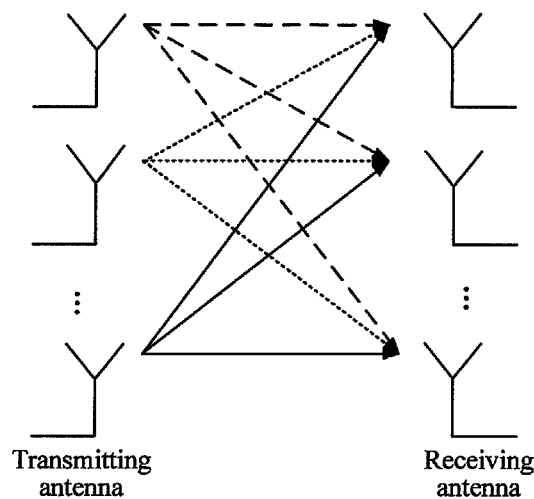
FIG. 1 is a schematic diagram of a MIMO receiving and transmitting system in which an embodiment of the present invention may be applied.

FIG. 1 is a schematic diagram of a MIMO receiving and transmitting system in which an embodiment of the present invention may be applied.

In FIG. 1, a transmitting terminal may have M transmitting antennas, where M is a positive integer. A receiving terminal may have N receiving antennas, where N is a positive integer.

The transmitting terminal may transmit signals $x=[x_1, x_2, \ldots, x_M]$ via the M transmitting antennas to the receiving terminal, that is, the transmitted signals all have M paths, where M is a positive integer. The receiving terminal may receive, via the N receiving antennas, signals transmitted by the transmitting terminal, and the received signals are $Y=[y_1, y_2, \ldots, y_N]$, where N is a positive integer.

Suppose that a spatial channel is H, then in a normal MIMO-OFDMA (Orthogonal Frequency Division Multiple Access, orthogonal frequency division multiple access) system, an OFDM system may transform a time-domain multi-path channel into a flat fading channel of each sub-carrier in a frequency domain, and therefore H may be considered as a matrix of N×M.

Suppose that noise of the receiving terminal is $Z=[z_1, z_2, \ldots, z_N]$, then the signals Y received by the receiving terminal may be represented by an equation (1.1):

$$Y=Hx+Z \qquad (1.1)$$

Therefore, the receiving terminal may demodulate Y to obtain the transmitting signal x of the transmitting terminal.

The receiving terminal may perform demodulation by using an ML algorithm, that is, traverse according to an equation (1.2):

$$\hat{x}=\arg\min|Y-H\hat{x}|^2 \qquad (1.2)$$

where, $\hat{x}$ is an estimate value of the transmitting signal x.

If all paths of signals in the M paths of signals transmitted by the transmitting terminal adopt the same modulation manner, suppose that a modulation order is p, and define $q=\log_2 p$. Therefore, the complexity of the receiving terminal in performing demodulation by using the ML algorithm may be represented as $O(p^M)$, and the complexity is $O(2^{qM})$.

Figure 2:
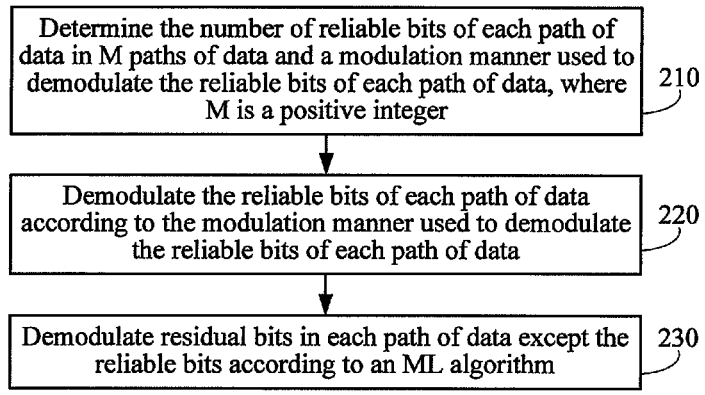
FIG. 2 is a schematic flow chart of a method for demodulating data according to an embodiment of the present invention.

FIG. 2 is a schematic flow chart of a method for demodulating data according to an embodiment of the present invention. The method in FIG. 2 is executed by a receiving terminal, which, for example, may be a user equipment (UE, User Equipment).

210: Determine the number of reliable bits of each path of data in M paths of data and a modulation manner used to demodulate the reliable bits of each path of data, where M is a positive integer.

220: Demodulate the reliable bits of each path of data according to the modulation manner used to demodulate the reliable bits of each path of data.

230: Demodulate residual bits in each path of data except the reliable bits according to an ML algorithm.

It should be noted that, in the embodiment of the present invention, data may refer to data to be demodulated, that is, data to be demodulated which is obtained according to an MMSE (Minimal Mean Square Error, minimal mean square error) algorithm, a ZF (Zero Forcing, zero forcing) algorithm or algorithms of other linear equalizers after the receiving terminal estimates a signal. For a process in which the receiving terminal obtains the data to be demodulated, reference may be made to the prior art. For example, in FIG. 1, a transmitting terminal may transmit M paths of signals via M transmitting antennas. After performing channel estimation on the M paths of signals, the receiving terminal may obtain, according to the MMSE algorithm, the ZF algorithm or the algorithms of other linear equalizers, M paths of data to be demodulated, which are called as M paths of data in the embodiment of the present invention for ease of description.

According to a closed-loop AMC (Adaptive Modulation and Coding, adaptive modulation and coding) manner often used in a communication system, a modulation manner adopted in a current TTI (Transmission Time Interval, transmission time interval) is generally determined according to situation of a channel in a last TTI, a basic supposition of doing this is that a channel corresponding to the current TTI has a strong relevancy with a channel corresponding to the last TTI. That is, compared with the last TTI, the current TTI does not change greatly, which means that an SNR does not change greatly. For example, in the condition that the last TTI adopts higher-order modulation, the situation of the channel in the current TTI may not worsen too much. In this way, directly modulating data in the current TTI can determine that some bits are demodulated correctly, and these bits are called reliable bits in the embodiment of the present invention. The reliable bits may be high-order bits in each path of data.

In this way, the receiving terminal may determine the number of the reliable bits of each path of data and the modulation manner used to demodulate the reliable bits of each path of data, demodulate the reliable bits of each path of data according to the modulation manner used to demodulate the reliable bits of each path of data, and then demodulate residual bits of each path of data according to the ML algorithm.

In the prior art, all bits of each path of data need to be demodulated according to the ML algorithm, so the complexity is quite high. However, in the embodiment of the present invention, it is unnecessary to demodulate all bits of each path of data according to the ML algorithm, and only the residual bits in each path of data except the reliable bits need to be demodulated according to the ML algorithm, thereby lowering the complexity of the receiving terminal in performing demodulation by using the ML algorithm.

Therefore, in the embodiments of the present invention, the number of the reliable bits of each path of data and the modulation manner used to demodulate the reliable bits of each path of data are determined, and the residual bits in each path of data except the reliable bits are demodulated according to the ML algorithm; therefore compared with the prior art, it is unnecessary to demodulate all bits of each path of data according to the ML algorithm, thereby lowering the complexity of demodulation by using the ML algorithm.

Optionally, as an embodiment, in step 210, the receiving terminal may determine an SINR (Signal to Interference and Noise Ratio, signal to interference and noise ratio) of each path of data; determine a modulation manner corresponding to the SINR of each path of data, according to SNR (Signal to Noise Ratio, signal to noise ratio) thresholds corresponding to modulation manners of different orders, and the SINR of each path of data; determine, according to the modulation manner corresponding to the SINR of each path of data, the number of reliable bits of each path of data and a modulation manner used to demodulate the reliable bits of each path of data.

Specifically, the receiving terminal may determine the SINR of each path of data according to the prior art. For example, for any $s^{th}$ path of data in the M paths of data, the MMSE algorithm may be used to determine an $SINR_s$ of the $s^{th}$ path of data according to an equation (2.1), where $1 \leq s \leq M$, $$SINR_s = \cfrac{1}{\left[I_M + \cfrac{1}{m}H^+H\right]_{ss}} - 1 \qquad (2.1)$$

where, H is a spatial channel, $H^+$ represents a transposed conjugate of the H; $I_M$ represents a unit matrix of M×M; and $$\frac{1}{m}$$

represents an SNR of a signal transmitted by the transmitting terminal.

The SNR thresholds corresponding to the modulation manners of different orders may refer to SNR values corresponding to the modulation manners of different orders in a non-code AWGN (Additive White Gaussion Noise, additive white Gaussion noise) channel in a fixed BER (Bit Error Rate, bit error rate). According to actual situations, the receiving terminal may adjust the SNR thresholds corresponding to the modulation manners of different orders respectively. If it is expected that the complexity of demodulation by using the ML algorithm is smaller, the SNR thresholds may be set lower. If it is expected that the demodulation by using the ML algorithm is more accurate, the SNR thresholds may be set higher.

The foregoing modulation manner may be a QAM (Quadrature Amplitude Modulation, quadrature amplitude modulation) manner, and also may be a PSK (Phase Shift Keying, phase shift keying) and the like, and also may be other modulation manners using similar principles, which is not limited in the embodiment of the present invention.

Optionally, as another embodiment, in step 210, for any $m^{th}$ path of data, if an SNR threshold corresponding to a modulation manner of which an order is $2^j \leq$ an SINR of the $m^{th}$ path of data<an SNR threshold corresponding to a modulation manner of which an order is $2^{j+2}$, a receiving terminal may determine that a modulation manner corresponding to the SINR of the $m^{th}$ path of data is the modulation manner of which the order is $2^j$, where j is an even number greater than or equal to 2, m is a positive integer, and $1 \leq m \leq M$.

Optionally, as another embodiment, in step 210, a receiving terminal may select a minimum SINR from all SINRs, determine the number of bits modulated in a modulation manner corresponding to the minimum SINR as the number of reliable bits of each path of data, and determine the modulation manner corresponding to the minimum SINR as a modulation manner used to demodulate the reliable bits of each path of data. Specifically, the number of the reliable bits of each path of data may be the number of the bits modulated in the modulation manner corresponding to the minimum SINR in all SINRs of the M paths of data, and the modulation manner used to demodulate the reliable bits of each path of data may be the modulation manner corresponding to the minimum SINR.

Optionally, as another embodiment, in step 210, a receiving terminal may determine the number of bits modulated in a modulation manner corresponding to an SINR of each path of data as the number of reliable bits of each path of data, and determine the modulation manner corresponding to the SINR of each path of data as a modulation manner used to demodulate the reliable bits of each path of data. Specifically, the number of the reliable bits of each path of data may be the number of the bits modulated in the modulation manner corresponding to the SINR of each path of data, and the modulation manner used to demodulate the reliable bits of each path of data may be the modulation manner corresponding to the SINR of each path of data.

Optionally, as another embodiment, in step 210, a receiving terminal may determine an order, that needs to be reduced, of a modulation manner corresponding to an SINR of each path of data according to the SINR of each path of data and an SNR threshold which corresponds to the modulation manner corresponding to the SINR of each path of data; perform order reduction for the modulation manner corresponding to the SINR of each path of data according to the order needing to be reduced; determine the number of bits modulated in an order-reduced modulation manner corresponding to the SINR of each path of data as the number of reliable bits of each path of data, and determine the order-reduced modulation manner corresponding to the SINR of each path of data as a modulation manner used to demodulate the reliable bits of each path of data.

Specifically, in view of an error of an SINR of each path of data, the receiving terminal may perform order reduction for the modulation manner corresponding to the SINR of each path of data, for example perform one-order reduction for the modulation manner corresponding to the SINR of each path of data. Besides, the receiving terminal may flexibly adjust the order, which needs to be reduced, of the modulation manner corresponding to the SINR of each path of data, which is not limited in the embodiment of the present invention. In this way, the reliability of the reliable bits of each path of data can be ensured. It should be noted that, in the embodiment of the present invention, in the M paths of data, an order of an actual modulation manner of any $m^{th}$ path of data may be an even power of 2, and may also be an odd power of 2. When a modulation manner of which an order is the even power of 2 is adopted to modulate the $m^{th}$ path of data, the number of bits of this path of data in an I path is the same as the number of bits in a Q path. When a modulation manner of which an order is the odd power of 2 is adopted to modulate the $m^{th}$ path of data, the number of bits of this path of data in the I path is different from the number of bits in the Q path. When determining the number of reliable bits of the $m^{th}$ path of data, whether the bits are the reliable bits is determined in a sequence from a high-order bit to a low-order bit. Therefore, the conditions that the order of the actual modulation manner of the $m^{th}$ path of data is the even power of 2 or the odd power of 2 are both applicable in the embodiment of the present invention.

Optionally, as another embodiment, in step 210, a receiving terminal may determine the number of reliable bits of each path of data in an I path of a constellation diagram and a modulation manner used to demodulate the reliable bits of each path of data in the I path, and determine the number of reliable bits of each path of data in a Q path of the constellation diagram and a modulation manner used to demodulate the reliable bits of each path of data in the Q path. It should be noted that, the modulation manner may be a QAM manner, and may also be other modulation manners adopting similar principles, which is not limited in the embodiment of the present invention.

Optionally, as another embodiment, in step 210, a receiving terminal may determine a real part of each path of data; and according to the real part of each path of data, and maximum amplitude values, corresponding to modulation manners of different orders, in a constellation diagram, determine the number of reliable bits of each path of data in an I path and a modulation manner used to demodulate the reliable bits of each path of data in the I path.

Optionally, as another embodiment, in step 210, for any $h^{th}$ path of data, if a maximum amplitude value, corresponding to a modulation manner of which an order is $2^i$, in a constellation diagram $\leq$ a real part $A_I$ of the $h^{th}$ path of data<a maximum amplitude value, corresponding to a modulation manner of which an order is $2^{i+2}$, in the constellation diagram, a receiving terminal may determine that the number of reliable bits of the $h^{th}$ path of data in an I path is i/2, and determine that a modulation manner used to demodulate the reliable bits of the $h^{th}$ path of data in the I path is the modulation manner of which the order is $2^i$, where i is an even number greater than or equal to 2, h is a positive integer, and $1 \leq h \leq M$.

It should be noted that, in the embodiment of the present invention, the order of the actual modulation manner of the $h^{th}$ path of data may be an even power of 2, and may also be an odd power of 2. When a modulation manner of which an order is the even power of 2 is adopted to modulate the $h^{th}$ path of data, the number of bits of this path of data in the I path is the same as the number of bits in a Q path. When a modulation manner of which an order is the odd power of 2 is adopted to modulate the $h^{th}$ path of data, the number of bits of this path of data in the I path is different from the number of bits in the Q path. In the embodiment of the present invention, the number of reliable bits in the I path and the number of reliable bits in the Q path are determined respectively. For the number of reliable bits in the I path and the number of reliable bits in the Q path, whether the bits are reliable bits is determined in a sequence from a high-order bit to a low-order bit. Therefore, the conditions that the order of the actual modulation manner of the $h^{th}$ path of data is the even power of 2 or the odd power of 2 are both applicable in the embodiment of the present invention.

Optionally, as another embodiment, in step 210, a receiving terminal may determine an imaginary part of each path of data; and according to the imaginary part of each path of data, and maximum amplitude values, corresponding to modulation manners of different orders, in a constellation diagram, determine the number of reliable bits of each path of data in a Q path and a modulation manner used to demodulate the reliable bits of each path of data in the Q path.

Optionally, as another embodiment, in step 210, for any $k^{th}$ path of data, if a maximum amplitude value, corresponding to a modulation manner of which an order is $2^n$, in a constellation diagram ≤ an imaginary part $A_Q$ of the $k^{th}$ path of data < a maximum amplitude value, corresponding to a modulation of which an order is $2^{n+2}$, in the constellation diagram, a receiving terminal may determine that the number of reliable bits of the $k^{th}$ path of data in a Q path is n/2, and determine that a modulation manner used to demodulate the reliable bits of the $k^{th}$ path of data in the Q path is the modulation manner of which the order is $2^n$, where n is an even number greater than or equal to 2, k is a positive integer, and 1≤k≤M.

It should be noted that, in the embodiment of the present invention, the order of the actual modulation manner of the $k^{th}$ path of data may be an even power of 2, and may also be an odd power of 2. When a modulation manner of which an order is the even power of 2 is adopted to modulate the $k^{th}$ path of data, the number of bits of this path of data in an I path is the same as the number of bits in the Q path. When a modulation manner of which an order is the odd power of 2 is adopted to modulate the $k^{th}$ path of data, the number of bits of this path of data in the I path is different from the number of bits in the Q path. In the embodiment of the present invention, the number of reliable bits in the I path and the number of reliable bits in the Q path are determined respectively. For the number of reliable bits in the I path and the number of reliable bits in the Q path, whether the bits are reliable bits is determined in a sequence from a high-order bit to a low-order bit. Therefore, the conditions that the order of the actual modulation manner of the $k^{th}$ path of data is the even power of 2 or the odd power of 2 are both applicable in the embodiment of the present invention.

Optionally, as another embodiment, in step 220, a receiving terminal may demodulate reliable bits of each path of data in an I path according to a modulation manner used to demodulate the reliable bits of each path of data in the I path, and demodulate reliable bits of each path of data in a Q path according to a modulation manner corresponding to the reliable bits of each path of data in the Q path.

Optionally, as another embodiment, the foregoing modulation manner may be a QAM manner. It should be noted that, in the embodiment of the present invention, the modulation manner may also be other modulation manners adopting similar principles, which is not limited in the embodiment of the present invention.

In the embodiments of the present invention, the number of the reliable bits of each path of data and the modulation manner used to demodulate the reliable bits of each path of data are determined, and the residual bits in each path of data except the reliable bits are demodulated according to the ML algorithm; therefore compared with the prior art, it is unnecessary to demodulate all bits of each path of data according to the ML algorithm, thereby lowering the complexity of demodulation by using the ML algorithm.

The following describes the embodiment of the present invention in detail with specific examples. It should be noted that, these examples only intend to help a person skilled in the art better understand the embodiment of the present invention, but not limit the scope of the embodiment of the present invention.

Figure 3:
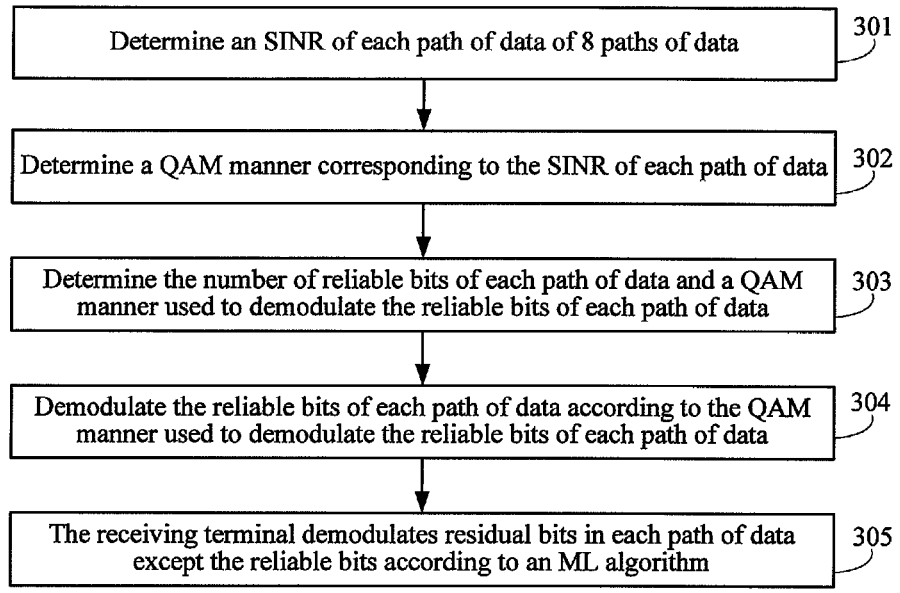
FIG. 3 is a schematic flow chart of a process of a method for demodulating data according to an embodiment of the present invention.

FIG. 3 is a schematic flow chart of a process of a method for demodulating data according to an embodiment of the present invention.

In FIG. 3, a modulation manner may be a QAM manner or a PSK manner. In FIG. 3, illustration may be made with an example that the modulation manner is the QAM manner. A processing procedure in which the modulation manner is the PSK manner is similar to a processing procedure in which the modulation manner is the QAM manner, which is not described here again in order to avoid repetition.

QAM generally includes 4QAM, 16QAM, 64QAM and so on, and does not lose generality. When an order of the QAM manner is p, the QAM manner may be represented as a pQAM manner, and it is defined $q=\log_2 p$. 4QAM is a special QAM manner, which is generally called as QPSK (Quadrature Phase Shift Keying, quadrature phase shift keying).

Bits modulated in a pQAM manner may be classified into two groups, namely I path and Q path, and the modulation bits may be represented as $I_1 Q_1 I_2 Q_2 \ldots I_{q/2} Q_{q/2}$. For example, for a 16QAM manner, modulation bits may be represented as $I_1 Q_1 I_2 Q_2$. For example, for a 256QAM manner, modulation bits may be represented as $I_1 Q_1 I_2 Q_2 I_3 Q_3 I_4 Q_4$.

In FIG. 3, suppose that there are 8 paths of data, each path of data is modulated in the 256QAM manner. Then the total number of bits of 8 paths of data is 8×8=64. If a receiving terminal uses an ML algorithm to demodulate all bits, the complexity of demodulation is O ($2^{64}$). Therefore, the complexity of the ML algorithm needs to be lowered. It should be noted that, in the embodiment of the present invention, it is supposed that each path of data is modulated in the 256QAM manner only for the convenience of description, but orders of the modulation manner actually adopted by different paths of data may be different, which is not limited in the embodiment of the present invention.

301: The receiving terminal determines an SINR of each path of data of 8 paths of data.

For example, the SINR of each path of data may be determined respectively according to an equation (2.1).

302: The receiving terminal determines a QAM manner corresponding to the SINR of each path of data according to SNR thresholds, which correspond to QAM manners of different orders, and the SINR of each path of data.

According to a BER performance curve of a QAM manner of each order in a non-code AWGN channel in the prior art, it may be known that when BER=$10^{-3}$, SNR thresholds corresponding to QPSK, 16QAM, 64QAM, 256QAM, 1024QAM and 4096QAM are about 7 dB, 16 dB, 23 dB, 29 dB, 36 dB and 42 dB respectively. It should be noted that, examples of the foregoing values only intend to help a person skilled in the art better understand the embodiment of the present invention, but not limit the embodiment of the present invention. According to channel processing and supposed situation, SNR thresholds adopted in different communication systems according to actual situations may be different.

Suppose that SINRs of 8 paths of data determined according to the equation (2.1) are 30 dB, 38 dB, 20 dB, 28 dB, 30 dB, 27 dB, 22 dB and 30 dB respectively.

For a first path of data, the SNR threshold, 29 dB, corresponding to the 256QAM manner<SINR=30 dB<the SNR threshold, 36 dB, corresponding to the 1024QAM manner, so the receiving terminal may determine that a modulation manner corresponding to the SINR of the first path of data is 256QAM. For other 7 paths of data, the modulation manner corresponding to the SINR of each path of data is determined in the same manner, where the modulation manners are 256QAM, 16QAM, 64QAM, 256QAM, 64QAM, 16QAM and 256QAM respectively.

303: The receiving terminal determines, according to the QAM manners corresponding to the SINRs of 8 paths of data respectively, the number of reliable bits of each path of data and a QAM manner used to demodulate the reliable bits of each path of data.

304: The receiving terminal demodulates the reliable bits of each path of data according to the QAM manner used to demodulate the reliable bits of each path of data.

305: The receiving terminal demodulates residual bits in each path of data except the reliable bits according to an ML algorithm.

The following describes step 303 to step 305.

Step 303 to step 305 may be executed in a plurality of manners:

Manner 1: Take the number of bits modulated in a QAM manner corresponding to a minimum SINR of the SINRs of 8 paths of data as the number of reliable bits of each path of data, and take the QAM manner corresponding to the minimum SINR as a QAM manner used to demodulate the reliable bits of each path of data. In the SINRs of 8 paths of data, an SINR of the $7^{th}$ path of data is the minimum, which is 22 dB and corresponds to a 16QAM manner. The number of bits modulated in the 16QAM manner is 4, so the number of reliable bits of each path of data in 8 paths of data may be 4, and the QAM manner used to demodulate the reliable bits of each path of data may be the 16QAM manner. Each path of data is demodulated in the 16QAM manner, so that the reliable bits $I_1Q_1I_2Q_2$ of each path of data are obtained. The residual bits $I_3Q_3I_4Q_4$ of each path of data are demodulated by using the ML algorithm, and $2^{4\times8}=2^{32}$ combinations need to be traversed. In this way, compared with demodulating all bits by using the ML algorithm, the complexity is lowered to $O(2^{32})$.

Manner 2: Take the number of bits modulated in a QAM manner corresponding to the SINR of each path of data as the number of reliable bits of each path of data. And take the QAM manner corresponding to the SINR of each path of data as a QAM manner of the reliable bits of each path of data.

Therefore, the reliable bits of each path of data may be demodulated by using the QAM manners corresponding to SINRs of 8 paths of data, where the QAM manners are 256QAM, 256QAM, 16QAM, 64QAM, 256QAM, 64QAM, 16QAM and 256QAM. That is, the 256QAM manner corresponding to the SINR of the first path is used to demodulate reliable bits of the first path of data to obtain the reliable bits $I_1Q_1I_2Q_2\,I_3Q_3I_4Q_4$ of the first path of data. The rest may be done in the same manner to obtain reliable bits $I_1Q_1I_2Q_2\,I_3Q_3I_4Q_4$ of the second path of data, reliable bits $I_1Q_1I_2Q_2I_3Q_3I_4Q_4$ of the fifth path of data and reliable bits $I_1Q_1I_2Q_2\,I_3Q_3I_4Q_4$ of the eighth path of data; obtain reliable bits $I_1Q_1I_2Q_2$ of the third path of data, reliable bits $I_1Q_1I_2Q_2$ of the seventh path of data; and obtain reliable bits $I_1Q_1I_2Q_2I_3Q_3$ of the fourth path of data, reliable bits $I_1Q_1I_2Q_2I_3Q_3$ of the sixth path of data.

Then the ML algorithm is used to demodulate residual bits $I_3Q_3I_4Q_4$ of the third path of data, residual bits $I_3Q_3I_4Q_4$ of the seventh path of data, residual bits $I_4Q_4$ of the fourth path of data and residual bits $I_4Q_4$ of the sixth path of data, and $2^{12}$ combinations need to be traversed. In this way, compared with demodulating all bits by using the ML algorithm, the complexity is lowered to $O(2^{12})$.

Manner 3: In view of an error of the SINR of each path of data, the receiving terminal may perform one-order reduction on the QAM manner corresponding to the SINR of each path of data, then the number of the reliable bits of each path of data can be the number of modulation bits corresponding to the one-order-reduced QAM manner corresponding to the SINR of each path of data, and the QAM manner used to demodulate the reliable bits of each path of data may be the one-order-reduced QAM manner corresponding to the SINR of each path of data. Therefore, the one-order-reduced QAM manners corresponding to the SINRs of 8 paths of data are: 64QAM, 64QAM, 4QAM, 16QAM, 64QAM, 16QAM, 4QAM and 64QAM. The one-order-reduced QAM manners are respectively used to demodulate the reliable bits of each path of data. That is, the 64QAM is used to demodulate the first path of data to obtain the reliable bits $I_1Q_1I_2Q_2I_3Q_3$ of the first path of data. The rest may be done in the same manner to obtain reliable bits $I_1Q_1I_2Q_2I_3Q_3$ of the second path of data, reliable bits $I_1Q_1I_2Q_2I_3Q_3$ of the fifth path of data and reliable bits $I_1Q_1I_2Q_2I_3Q_3$ of the eighth path of data; obtain reliable bits $I_1Q_1$ of the third path of data, reliable bits $I_1Q_1$ of the seventh path of data; and obtain reliable bits $I_1Q_1I_2Q_2$ of the fourth path of data, reliable bits $I_1Q_1I_2Q_2$ of the sixth path of data.

Then the ML algorithm is used to demodulate residual bits $I_4Q_4$ of the first path of data, residual bits $I_4Q_4$ of the second path of data, residual bits $I_4Q_4$ of the fifth path of data and residual bits $I_4Q_4$ of the eighth path of data, and residual bits $I_2Q_2I_3Q_3I_4Q_4$ of the third path of data, residual bits $I_2Q_2I_3Q_3I_4Q_4$ of the seventh path of data, and residual bits $I_3Q_3I_4Q_4$ of the fourth path of data and residual bits $I_3Q_3I_4Q_4$ of the sixth path of data, and $2^{28}$ combinations need to be traversed. In this way, compared with demodulating all bits by using the ML algorithm, the complexity is lowered to $O(2^{28})$.

Manner 4: Based on manner 3, the receiving terminal may flexibly determine an order, which needs to be reduced, of the QAM manner corresponding to the SINR of each path of data according to the current computing resource and a difference between the SINR of each path of data and an SNR threshold of the QAM manner corresponding to the SINR of each path of data, thereby flexibly adjusting the number of bits traversed by using the ML. For example, an SINR of the first path of data is 30 dB, only 1 dB higher than an SNR threshold, 29 dB, corresponding to the 256QAM, and an SINR of the second path of data is 38 dB, 9 dB higher than the SNR threshold, 29 dB, corresponding to the 256QAM; therefore the second path of data may be considered to be more reliable, and a certain order may be reduced for the first path of data. Besides, a priority of a reduced order of the QAM manner corresponding to the SINR of each path of data, for example, in the foregoing, it may be considered that the second path of data is more reliable than the first path of data, so a priority of a reduced order of the QAM manner corresponding to the SINR of the first path of data is higher than that of the second path of data.

It should be noted that, in the embodiment of the present invention, an order of the QAM modulation manner actually adopted when any one path of data is modulated may be an even power of 2, and may also be an odd power of 2, which is not limited in the embodiment of the present invention. When a QAM manner of which an order is the even power of 2 is adopted to modulate this path of data, the number of bits in an I path is the same as the number of bits in a Q path. For example, suppose that this path of data is modulated in a 256QAM manner, then the bits of this path of data may be represented as $I_1Q_1I_2Q_2I_3Q_3I_4Q_4$. When a QAM manner of which an order is the odd power of 2 is adopted to modulate this path of data, the number of bits in the I path is different from the number of bits in the Q path.

For example, suppose that this path of data is modulated in a 32QAM manner, then the bits of this path of data may be represented as $I_1Q_1I_2Q_2I_3$ and may also be represented as $I_1Q_1I_2Q_2Q_3$. For example, this path of data is modulated in the 32QAM manner, the SINR of this path of data corresponds to a 16QAM manner. If the foregoing manner 2 is adopted, the number of bits modulated in the 16QAM manner corresponding to the SINR of this path of data is taken as the number of reliable bits of this path of data, then this path of data has 4 reliable bits. Because the reliable bits are determined in a sequence from a high-order bit to a low-order bit, the reliable bits are high-order bits, and the reliable bits of this path of data are $I_1Q_1I_2Q_2$. Still for example, suppose that the SINR of this path of data corresponds to a 64QAM manner. If the foregoing manner 2 is still adopted, the number of bits modulated in a 64QAM manner corresponding to the SINR of this path of data is taken as the number of reliable bits of this path of data. Although the number of bits modulated in the 64QAM manner is 6, the number of bits of this path of data is 5, and then the number of the reliable bits of this path of data may be determined to be 5, that is, the reliable bits are $I_1Q_1I_2Q_2I_3$ or $I_1Q_1I_2Q_2Q_3$. In the embodiment of the present invention, the receiving terminal determines the number of the reliable bits of each path of data and the QAM modulation manner used to demodulate the reliable bits of each path of data, and demodulates the residual bits in each path of data except the reliable bits according to the ML algorithm; therefore, compared with the prior art, it is unnecessary to demodulate all bits of each path of data according to the ML algorithm, thereby lowering the complexity of demodulation by using the ML algorithm.

Figure 4:
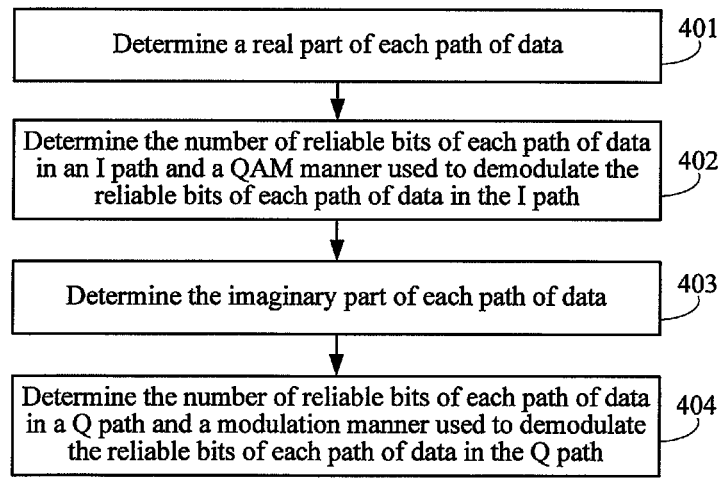
FIG. 4 is a schematic flow chart of a process of a method for demodulating data according to another embodiment of the present invention.

FIG. 4 is a schematic flow chart of a process of a method for demodulating data according to another embodiment of the present invention.

In FIG. 4, illustration is made with an example that a modulation manner is a pQAM manner.

401: A receiving terminal determines a real part of each path of data.

After receiving M paths of signals from a transmitting terminal, the receiving terminal obtains the M paths of data by using an algorithm such as MMSE and ZF, and separates the real part of each path of data from an imaginary part to determine the real part of each path of data.

402: The receiving terminal determines, according to the real part of each path of data and maximum amplitude values, corresponding to QAM manners of different orders, in a constellation diagram, the number of reliable bits of each path of data in an I path and a QAM manner used to demodulate the reliable bits of each path of data in the I path.

Optionally, for any $h^{th}$ path of data, if a maximum amplitude value, corresponding to a QAM manner of which an order is $2^i$, in the constellation diagram≤a real part $A_I$ of the $h^{th}$ path of data<a maximum amplitude value, corresponding to a QAM manner of which an order is $2^{i+2}$, in the constellation diagram, the receiving terminal may determine that the number of reliable bits of the $h^{th}$ path of data in the I path is i/2, and determine that a QAM manner used to demodulate the reliable bits of the $h^{th}$ path of data in the I path is the QAM manner of which the order is $2^i$, where i is an even number greater than or equal to 2, h is a positive integer, and $1 \leq h \leq M$.

403: The receiving terminal determines the imaginary part of each path of data.

For a determining manner, reference may be made to step 401.

404: The receiving terminal determines, according to the imaginary part of each path of data and maximum amplitude values, corresponding to QAM manners of different orders, in the constellation diagram, the number of reliable bits of each path of data in a Q path and a modulation manner used to demodulate the reliable bits of each path of data in the Q path.

Optionally, for any $k^{th}$ path of data, if a maximum amplitude value, corresponding to a QAM manner of which an order is $2^n$, in the constellation diagram≤an imaginary part $A_Q$ of the $k^{th}$ path of data<a maximum amplitude value, corresponding to a QAM manner of which an order is $2^{n+2}$, in the constellation diagram, the receiving terminal may determine that the number of reliable bits of the $k^{th}$ path of data in the Q path is n/2, and determine that a QAM manner used to demodulate the reliable bits of the $k^{th}$ path of data in the Q path is the QAM manner of which the order is $2^n$, where n is an even number greater than or equal to 2, k is a positive integer, and $1 \leq k \leq M$.

It should be understood that, the serial number of each foregoing procedure does not mean the sequence of execution, and the execution sequence of each procedure should be determined according to the function and inner logic, but not limit the implementation procedure of the embodiment of the present invention. For example, steps 401-402 may be executed simultaneously when steps 403-404 are executed or may be executed after the steps 403-404 are executed.

It should be noted that, in the embodiment of the present invention, the order of the QAM modulation manner actually adopted when any one path of data is modulated may be an even power of 2, and may also be an odd power of 2, which is not limited in the embodiment of the present invention. When a QAM manner of which an order is the even power of 2 is adopted to modulate this path of data, the number of bits in the I path is the same as the number of bits in the Q path. For example, suppose that this path of data is modulated in a 256QAM manner, then the bits of this path of data may be represented as $I_1Q_1I_2Q_2I_3Q_3I_4Q_4$. When a QAM manner of which an order is the odd power of 2 is adopted to modulate this path of data, the number of bits in the I path is different from the number of bits in the Q path. For example, suppose that this path of data is modulated in a 32QAM manner, then the bits of this path of data may be represented as $I_1Q_1I_2Q_2I_3$ and may also be represented as $I_1Q_1I_2Q_2Q_3$. In the embodiment of the present invention, the number of reliable bits in the I path and the number of reliable bits in the Q path are determined respectively, and for the number of reliable bits in the I path and the number of reliable bits in the Q path, whether the bits are reliable bits is determined in a sequence from a high-order bit to a low-order bit. Therefore, the conditions that the order of the QAM manner actually adopted when any one path of data is modulated is the even power of 2 or the odd power of 2 are both applicable in the embodiment of the present invention.

Figure 5:
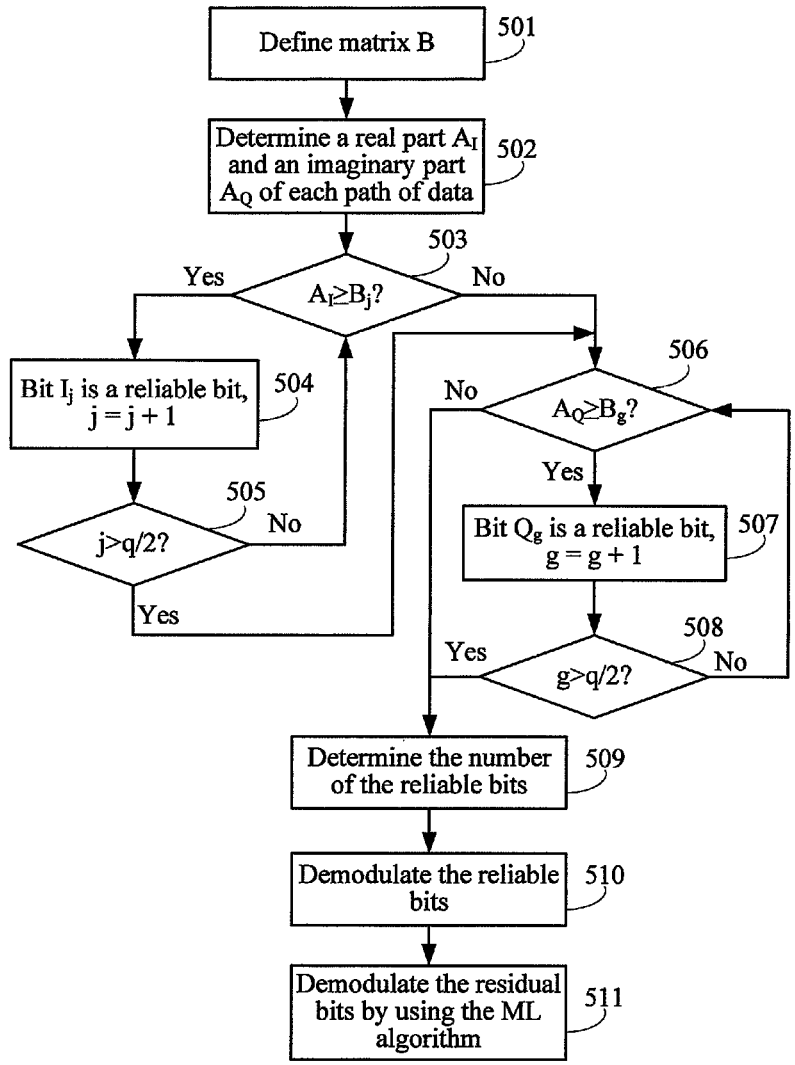
FIG. 5 is a schematic flow chart of a method for demodulating data according to another embodiment of the present invention.

The following describes steps 401 to 404 in detail with an example in FIG. 5. FIG. 5 is a schematic flow chart of a method for demodulating data according to another embodiment of the present invention.

For example, suppose a highest-order QAM manner is 1024QAM. Each path of data is modulated in a pQAM manner, and it is defined $q=\log_2 p$. Then, for any one path of data, processing may be performed according to the following steps. It should be noted that, in the embodiment of the present invention, it is supposed that each path of data is modulated in the pQAM manner only for the convenience of description, but orders of the modulation manner actually adopted by different paths of data may be different, which is not limited in the embodiment of the present invention.

501: Define matrix $B=[A_4\ A_{16}\ A_{64}\ A_{256}\ A_{1024}]$.

$A_4$ is a maximum amplitude value, corresponding to the QPSK manner, in a constellation diagram, and $A_4=\text{sqrt}(2)/2$. $A_{16}$ is a maximum amplitude value, corresponding to the 16QAM manner, in the constellation diagram, and $A_{16}=3/\text{sqrt}(10)$. $A_{64}$ is a maximum amplitude value, corresponding to the 64QAM manner, in the constellation diagram, and $A_{64}=7/\text{sqrt}(42)$. $A_{256}$ is a maximum amplitude value, corresponding to the 256QAM manner, in the constellation diagram, and $A_{256}=15/\text{sqrt}(170)$. $A_{1024}$ is a maximum amplitude value, corresponding to the 1024QAM manner, in the constellation diagram, and $A_{1024}=31/\text{sqrt}(682)$.

502: Determine a real part $A_I$ and an imaginary part $A_Q$ of each path of data.

503: Determine whether $A_I \geq B_j$ is correct, where j=1.

If it is determined that $A_I \geq B_j$ is correct in step 503, the procedure proceeds to step 504 to determine a bit as a reliable bit and enable j=j+1.

505: Determine whether $j>q/2$ is correct.

If it is determined that $j>q/2$ is not correct in step 505, the procedure returns to step 503 to continue to determine whether is correct, that is, continue to determine the number of reliable bits of this path of data in the I path.

If it is determined that $j>q/2$ is correct in step 505, the determining of the number of the reliable bits of this path of data in the I path ends, and the procedure proceeds to step 506 to determine whether $A_Q \geq B_g$ is correct, where g=1, that is, start to determine the number of reliable bits in the Q path.

If it is determined that $A_I \geq B_j$ is not correct in step 503, the determining of the number of the reliable bits of this path of data in the I path ends, and the procedure proceeds to step 506.

If it is determined that $A_Q \geq B_g$ is correct in step 506, the procedure proceeds to step 507 to determine a bit $Q_g$ as a reliable bit and enable g=g+1.

508: Determine whether $g>q/2$ is correct.

If it is determined that $g>q/2$ is not correct in step 508, the procedure returns to step 506 to continue to determine whether $A_I \geq B_j$ is correct, that is, continue to determine the number of the reliable bits of this path of data in the Q path.

If it is determined that $A_Q \geq B_g$ is not correct in step 506, the procedure proceeds to step 509, and the determining the number of the reliable bits ends. The reliable bits of this path of data are $I_1 I_2 \ldots I_{(j-1)} Q_1 Q_2 \ldots Q_{(g-1)}$.

If it is determined that $g>q/2$ is correct in step 508, the procedure also proceeds to step 509.

510: Demodulate the reliable bits of this path of data in the I path by using a $2^{j-1}$ QAM manner, and demodulate the reliable bits of this path of data in the Q path by using a $2^{g-1}$ QAM manner.

511: Demodulate residual bits of this path of data by using the ML algorithm.

The foregoing steps 503 to 505 may be executed at the same time when the steps 506 to 508 are executed, and may also be executed after the steps 506 to 508 are executed.

The number of the residual bits of this path of data is $[q-(j-1)-(g-1)]$, which can reduce the number of bits needing to be traversed by using the ML algorithm, thereby lowering the complexity of demodulation by using the ML algorithm.

After each path of data in M paths of data is processed according to steps 501 to 511, the complexity is lowered from the original $O(2^{qm})$ to $$O\big(2^{qM-\sum_{t=1}^{M}(j_t+g_t-2)}\big),$$

where $j_t$ represents j of the $t^{th}$ path of data; $g_t$ represents g of the $t^{th}$ path, where $1 \leq t \leq M$.

It should be understood that, in the embodiment of the present invention, the reliable bits of each path of data in the I path or in the Q path may be determined according to actual situations and by using other amplitude values, corresponding to QAM of different orders, in the constellation diagram, as the amplitude thresholds. For example, if it is expected that the complexity of demodulation by using the ML algorithm is smaller, the reliable bits need to be more, so a lower amplitude threshold may be selected. If it is expected that the detection is more accurate, a higher amplitude threshold may be selected.

In the embodiment of the present invention, the receiving terminal determines the number of the reliable bits of each path of data and the QAM modulation manner used to demodulate the reliable bits of each path of data, and demodulates the residual bits in each path of data except the reliable bits according to the ML algorithm; therefore, compared with the prior art, it is unnecessary to demodulate all bits of each path of data according to the ML algorithm, thereby lowering the complexity of demodulation by using the ML algorithm.

Figure 6:
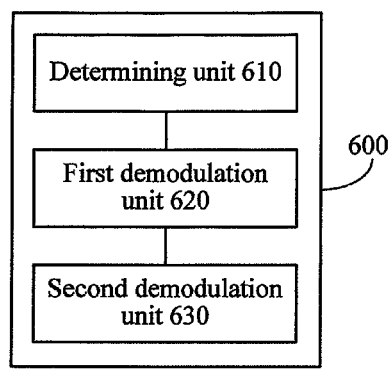
FIG. 6 is a schematic block diagram of a device for demodulating data according to an embodiment of the present invention.

FIG. 6 is a schematic block diagram of a device for demodulating data according to an embodiment of the present invention. An example of a device 600 in FIG. 6 is a receiving terminal, which, for example, may be a UE. The device 600 in FIG. 6 includes a determining unit 610, a first demodulation unit 620 and a second demodulation unit 630.

The determining unit 610 determines the number of reliable bits of each path of data in M paths of data and a modulation manner used to demodulate the reliable bits of each path of data, where M is a positive integer. The first demodulation unit 620 demodulates the reliable bits of each path of data according to the modulation manner used to demodulate the reliable bits of each path of data. The second demodulation unit 630 demodulates residual bits in each path of data except the reliable bits according to an ML algorithm.

In the embodiments of the present invention, the number of the reliable bits of each path of data and the modulation manner used to demodulate the reliable bits of each path of data are determined, and the residual bits in each path of data except the reliable bits are demodulated according to the ML algorithm; therefore, compared with the prior art, it is unnecessary to demodulate all bits of each path of data according to the ML algorithm, thereby lowering the complexity of demodulation by using the ML algorithm.

For other functions and operation of the device 600 in FIG. 6, reference may be made to the procedure of the method embodiments in FIG. 2 to FIG. 5 in the foregoing, which is not described here again in order to avoid repetition.

Optionally, as an embodiment, the determining unit 610 may determine an SINR of each path of data; determine a modulation manner corresponding to the SINR of each path of data according to SNR thresholds corresponding to modulation manners of different orders, and the SINR of each path of data; and determine, according to the modulation manner corresponding to the SINR of each path of data, the number of reliable bits of each path of data and a modulation manner used to demodulate each path of data.

Optionally, as another embodiment, for any $m^{th}$ path of data, if an SNR threshold corresponding to a modulation manner of which an order is $2^j \le$ an SINR of the $m^{th}$ path of data < an SNR threshold corresponding to a modulation manner of which an order is $2^{j+2}$, the determining unit 610 may determine that a modulation manner corresponding to the SINR of the $m^{th}$ path of data is the modulation manner of which the order is $2^j$, where j is an even number greater than or equal to 2, m is a positive integer, and $1 \le m \le M$.

Optionally, as another embodiment, the determining unit 610 may select a minimum SINR from all SINRs, determine the number of bits modulated in a modulation manner corresponding to the minimum SINR as the number of reliable bits of each path of data, and determine a modulation manner corresponding to the minimum SINR as a modulation manner used to demodulate the reliable bits of each path of data.

Optionally, as another embodiment, the determining unit 610 may determine the number of bits modulated in a modulation manner corresponding to an SINR of each path of data as the number of reliable bits of each path of data, and determine the modulation manner corresponding to the SINR of each path of data as a modulation manner used to demodulate the reliable bits of each path of data.

Optionally, as another embodiment, the determining unit 610 may determine an order, which needs to be reduced, of a modulation manner corresponding to an SINR of each path of data according to the SINR of each path of data and an SNR threshold which corresponds to the modulation manner corresponding to the SINR of each path of data; perform order reduction for the modulation manner corresponding to the SINR of each path of data according to the order which needs to be reduced; determine the number of bits modulated in an order-reduced modulation manner corresponding to the SINR of each path of data as the number of reliable bits of each path of data, and determine the order-reduced modulation manner corresponding to the SINR of each path of data as a modulation manner used to demodulate the reliable bits of each path of data.

Optionally, as another embodiment, the determining unit 610 may determine the number of reliable bits of each path of data in an I path of a constellation diagram and a modulation manner used to demodulate the reliable bits of each path of data in the I path, and determine the number of reliable bits of each path of data in a Q path of the constellation diagram and a modulation manner used to demodulate the reliable bits of each path of data in the Q path.

Optionally, as another embodiment, the determining unit 610 may determine a real part of each path of data; and determine, according the real part of each path of data, and maximum amplitude values, corresponding to modulation manners of different orders, in a constellation diagram, the number of reliable bits of each path of data in an I path and a modulation manner used to demodulate the reliable bits of each path of data in the I path.

Optionally, as another embodiment, for any $h^{th}$ path of data, if a maximum amplitude value, corresponding to a modulation manner of which an order is $2^i$, in a constellation diagram $\le$ a real part $A_I$ of the $h^{th}$ path of data < a maximum amplitude value, corresponding to a modulation manner of which an order is $2^{i+2}$, in the constellation diagram, the determining unit 610 may determine that the number of reliable bits of the $h^{th}$ path of data in an I path is i/2, and determine that a modulation manner used to demodulate the reliable bits of the $h^{th}$ path of data in the I path is the modulation manner of which the order is $2^i$, where i is an even number greater than or equal to 2, h is a positive integer, and $1 \le h \le M$.

Optionally, as another embodiment, the determining unit 610 may determine an imaginary part of each path of data; and determine, according the imaginary part of each path of data, and maximum amplitude values, corresponding to modulation manners of different orders, in the constellation diagram, the number of reliable bits of each path of data in a Q path and a modulation manner used to demodulate the reliable bits of each path of data in the Q path.

Optionally, as another embodiment, for any $k^{th}$ path of data, if a maximum amplitude value, corresponding to a modulation manner of which an order is $2^n$, in a constellation diagram $\le$ an imaginary part $A_Q$ of the $k^{th}$ path of data < a maximum amplitude value, corresponding to a modulation manner of which an order is $2^{n+2}$, in the constellation diagram, the determining unit 610 may determine that the number of reliable bits of the $k^{th}$ path of data in a Q path is n/2, and determine that a modulation manner used to demodulate the reliable bits of the $k^{th}$ path of data in the Q path is the modulation manner of which the order is $2^n$, where n is an even number greater than or equal to 2, k is a positive integer, and $1 \le k \le M$.

Optionally, as another embodiment, the first demodulation unit 620 may demodulate the reliable bits of each path of data in an I path according to the modulation manner used to demodulate the reliable bits of each path of data in the I path, and demodulate the reliable bits of each path of data in a Q path according to the modulation manner corresponding to the reliable bits of each path of data in the Q path.

Optionally, as another embodiment, the foregoing modulation manner may be a QAM manner.

In the embodiments of the present invention, the number of the reliable bits of each path of data and the modulation manner used to demodulate the reliable bits of each path of data are determined, and the residual bits in each path of data except the reliable bits are demodulated according to the ML algorithm; therefore, compared with the prior art, it is unnecessary to demodulate all bits of each path of data according to the ML algorithm, thereby lowering the complexity of demodulation by using the ML algorithm.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described here again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiment of the present invention. The storage medium includes: any medium that may store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for demodulating data, the method comprising:
    determining a number of reliable bits of each path of data in M paths of data and a modulation manner used to demodulate the reliable bits of each path of data, wherein M is a positive integer greater than or equal to 2, the number of reliable bits being different between a first path of data and a second path of data in the M paths of data;
    demodulating the reliable bits of each path of data according to the modulation manner used to demodulate the reliable bits of each path of data; and
    demodulating residual bits in each path of data except the reliable bits according to a maximal likelihood ML algorithm.

2. The method according to claim 1, wherein determining the number of reliable bits of each path of data in M paths of data and the modulation manner used to demodulate the reliable bits of each path of data comprises:
    determining a signal to interference and noise ratio (SINR) of each path of data;
    determining a modulation manner corresponding to the SINR of each path of data according to signal to noise ratio (SNR) thresholds corresponding to modulation manners of different orders, respectively, and an SINR of each path of data; and
    determining, according to the modulation manner corresponding to the SINR of each path of data, the number of reliable bits of each path of data and the modulation manner used to demodulate the reliable bits of each path of data.

3. The method according to claim 2, wherein determining the modulation manner corresponding to the SINR of each path of data according to the signal to noise ratio SNR thresholds corresponding to modulation manners of different orders, respectively, and the SINR of each path of data comprises:
    for any $m^{th}$ path of data, if an SNR threshold corresponding to a modulation manner of which an order is $2^j \leq$ an SINR of the $m^{th}$ path of data $<$ an SNR threshold corresponding to a modulation manner of which an order is $2^{j+2}$, determining that a modulation manner corresponding to the SINR of the $m^{th}$ path of data is the modulation manner of which the order is $2^j$, wherein j is an even number greater than or equal to 2, m is a positive integer, and $1 \leq m \leq M$.

4. A method for demodulating data, the method comprising:
    determining a number of reliable bits of each path of data in M paths of data and a modulation manner used to demodulate the reliable bits of each path of data, wherein M is a positive integer;
    demodulating the reliable bits of each path of data according to the modulation manner used to demodulate the reliable bits of each path of data; and
    demodulating residual bits in each path of data except the reliable bits according to a maximal likelihood ML algorithm;
    wherein determining the number of reliable bits of each path of data in M paths of data and the modulation manner used to demodulate the reliable bits of each path of data comprises:
        determining a signal to interference and noise ratio (SINR) of each path of data;
        determining a modulation manner corresponding to the SINR of each path of data according to signal to noise ratio (SNR) thresholds corresponding to modulation manners of different orders, respectively, and an SINR of each path of data; and
        determining, according to the modulation manner corresponding to the SINR of each path of data, the number of reliable bits of each path of data and the modulation manner used to demodulate the reliable bits of each path of data;
    wherein determining, according to the modulation manner corresponding to the SINR of each path of data, the number of reliable bits of each path of data and the modulation manner used to demodulate the reliable bits of each path of data comprises:
        selecting a minimum SINR from all determined SINRs, determining the number of bits modulated in a modulation manner corresponding to the minimum SINR as the number of the reliable bits of each path of data, and determining the modulation manner corresponding to the minimum SINR as the modulation manner used to demodulate the reliable bits of each path of data.

5. The method according to claim 2, wherein determining, according to the modulation manner corresponding to the SINR of each path of data, the number of reliable bits of each path of data and the modulation manner used to demodulate the reliable bits of each path of data comprises:
   determining the number of bits modulated in a modulation manner corresponding to the SINR of each path of data as the number of the reliable bits of each path of data; and
   determining the modulation manner corresponding to the SINR of each path of data as the modulation manner used to demodulate the reliable bits of each path of data.

6. A method for demodulating data, the method comprising:
   determining a number of reliable bits of each path of data in M paths of data and a modulation manner used to demodulate the reliable bits of each path of data, wherein M is a positive integer;
   demodulating the reliable bits of each path of data according to the modulation manner used to demodulate the reliable bits of each path of data; and
   demodulating residual bits in each path of data except the reliable bits according to a maximal likelihood ML algorithm;
   wherein determining the number of reliable bits of each path of data in M paths of data and the modulation manner used to demodulate the reliable bits of each path of data comprises:
      determining a signal to interference and noise ratio (SINR) of each path of data;
      determining a modulation manner corresponding to the SINR of each path of data according to signal to noise ratio (SNR) thresholds corresponding to modulation manners of different orders, respectively, and an SINR of each path of data; and
      determining, according to the modulation manner corresponding to the SINR of each path of data, the number of reliable bits of each path of data and the modulation manner used to demodulate the reliable bits of each path of data;
   wherein determining, according to the modulation manner corresponding to the SINR of each path of data, the number of reliable bits of each path of data and the modulation manner used to demodulate the reliable bits of each path of data comprises:
      determining an order, which needs to be reduced, of the modulation manner corresponding to the SINR of each path of data, according to the SNR of each path of data and an SNR threshold which corresponds to the modulation manner corresponding to the SINR of each path of data;
      performing order reduction for the modulation manner corresponding to the SINR of each path of data according to the order needing to be reduced; and
      determining the number of bits modulated in an order-reduced modulation manner corresponding to the SINR of each path of data as the number of the reliable bits of each path of data, and determining the order-reduced modulation manner corresponding to the SINR of each path of data as the modulation manner used to demodulate each path of data.

7. The method according to claim 1, wherein determining the number of reliable bits of each path of data in M paths of data and the modulation manner used to demodulate the reliable bits of each path of data comprises:
   determining the number of reliable bits of each path of data in an I path of a constellation diagram and a modulation manner used to demodulate the reliable bits of each path of data in the I path; and
   determining the number of reliable bits of each path of data in a Q path of the constellation diagram and a modulation manner used to demodulate the reliable bits of each path of data in the Q path.

8. The method according to claim 7, wherein determining the number of reliable bits of each path of data in the I path of the constellation diagram and the modulation manner used to demodulate the reliable bits of the each path of data in the I path comprises:
   determining a real part of each path of data; and
   determining, according to the real part of each path of data and maximum amplitude values, corresponding to modulation manners of different orders, in the constellation diagram, the number of reliable bits of each path of data in the I path and a modulation manner used to demodulate the reliable bits of each path of data in the I path.

9. The method according to claim 8, wherein determining, according to the real part of each path of data and the maximum amplitude values, corresponding to modulation manners of different orders, in the constellation diagram, the number of reliable bits of each path of data in the I path and the modulation manner used to demodulate the reliable bits of each path of data in the I path comprises:
   for any $h^{th}$ path of data, if a maximum amplitude value, corresponding to a modulation manner of which an order is $2^i$, in the constellation diagram≤a real part $A_I$ of the $h^{th}$ path of data <a maximum amplitude value, corresponding to a modulation manner of which an order is $2^{i+2}$, in the constellation diagram, determining that the number of reliable bits of the $h^{th}$ path of data in the I path is i/2, and determining that a modulation manner used to demodulate the reliable bits of the $h^{th}$ path of data in the I path is the modulation manner of which the order is $2^i$, wherein i is an even number greater than or equal to 2, h is a positive integer, and 1≤h<M.

10. The method according to claim 7, wherein determining the number of reliable bits of each path of data in the Q path of the constellation diagram and the modulation manner used to demodulate the reliable bits of each path of data in the Q path comprises:
    determining an imaginary part of each path of data; and
    determining, according to the imaginary part of each path of data and maximum amplitude values, corresponding to modulation manners of different orders, in the constellation diagram, the number of reliable bits of each path of data in the Q path and a modulation manner used to demodulate the reliable bits of each path of data in the Q path.

11. The method according to claim 10, wherein determining, according to the imaginary part of each path of data and the maximum amplitude values, corresponding to modulation manners of different orders, in the constellation diagram, the number of reliable bits of each path of data in the Q path and a modulation manner used to demodulate the reliable bits of each path of data in the Q path comprises:
    for any $k^{th}$ path of data, if a maximum amplitude value, corresponding to a modulation manner of which an order is $2^n$, in the constellation diagram≤a real part $A_Q$ of the $k^{th}$ path of data<a maximum amplitude value, corresponding to a modulation manner of which an order is $2^{n+2}$, in the constellation diagram, determining that the number of reliable bits of the $k^{th}$ path of data in the Q path is n/2, and determining that a modulation manner used to demodulate the reliable bits of the $k^{th}$ path of data in the Q path is the modulation manner of which the order is $2^n$, wherein n is an even number greater than or equal to 2, k is a positive integer, and 1≤k≤M.

12. The method according to claim 7, wherein demodulating the reliable bits of each path of data according to the modulation manner used to demodulate the reliable bits of each path of data comprises:
   demodulating the reliable bits of each path of data in the I path according to the modulation manner used to demodulate the reliable bits of each path of data in the I path; and
   demodulating the reliable bits of each path of data in the Q path according to the modulation manner corresponding to the reliable bits of each path of data in the Q path.

13. The method according to claim 1, wherein the modulation manner is a quadrature amplitude modulation QAM manner.

14. A device for demodulating data, the device comprising:
   a determining unit, configured to determine a number of reliable bits of each path of data in M paths of data and a modulation manner used to demodulate the reliable bits of each path of data, wherein M is a positive integer greater than or equal to 2, the number of reliable bits being different between a first path of data and a second path of data in the M paths of data;
   a first demodulation unit, configured to demodulate the reliable bits of each path of data according to the modulation manner used to demodulate the reliable bits of each path of data; and
   a second demodulation unit, configured to demodulate residual bits in each path of data except the reliable bits according to a maximal likelihood ML algorithm.

15. The device according to claim 14, wherein the determining unit is configured to:
   determine a signal to interference and noise ratio SINR of each path of data;
   determine a modulation manner corresponding to the SINR of each path of data according to signal to noise ratio SNR thresholds corresponding to modulation manners of different orders respectively, and the SINR of each path of data; and
   determine, according to the modulation manner corresponding to the SINR of each path of data, the number of reliable bits of each path of data and the modulation manner used to demodulate the reliable bits of each path of data.

16. The device according to claim 15, wherein the determining unit is configured to:
   for any $m^{th}$ path of data, if an SNR threshold corresponding to a modulation manner of which an order is $2^j$≤an SINR of the $m^{th}$ path of data<an SNR threshold corresponding to a modulation manner of which an order is $2^{j+2}$, determine that a modulation manner corresponding to the SINR of the $m^{th}$ path of data is the modulation manner of which the order is $2^j$, wherein j is an even number greater than or equal to 2, m is a positive integer, and 1 ≤m≤M.

17. A device for demodulating data, the device comprising:
   a determining unit, configured to determine a number of reliable bits of each path of data in M paths of data and a modulation manner used to demodulate the reliable bits of each path of data, wherein M is a positive integer;
   a first demodulation unit, configured to demodulate the reliable bits of each path of data according to the modulation manner used to demodulate the reliable bits of each path of data; and
   a second demodulation unit, configured to demodulate residual bits in each path of data except the reliable bits according to a maximal likelihood ML algorithm;
   wherein the determining unit is configured to:
      determine a signal to interference and noise ratio SINR of each path of data
      determine a modulation manner corresponding to the SINR of each path of data according to signal to noise ratio SNR thresholds corresponding to modulation manners of different orders respectively, and the SINR of each path of data; and
      determine, according to the modulation manner corresponding to the SINR of each path of data, the number of reliable bits of each path of data and the modulation manner used to demodulate the reliable bits of each path of data;
   wherein the determining unit is configured to:
      select a minimum SINR from all determined SINRs, determine the number of bits modulated in a modulation manner corresponding to the minimum SINR as the number of the reliable bits of each path of data; and
      determine the modulation manner corresponding to the minimum SINR as the modulation manner used to demodulate the reliable bits of each path of data.

18. The device according to claim 15, wherein the determining unit is configured to:
   determine the number of bits modulated in a modulation manner corresponding to an SINR of each path of data as the number of reliable bits of each path of data; and
   determine the modulation manner corresponding to the SINR of each path of data as the modulation manner used to demodulate the reliable bits of each path of data.

19. A device for demodulating data, the device comprising:
   a determining unit, configured to determine a number of reliable bits of each path of data in M paths of data and a modulation manner used to demodulate the reliable bits of each path of data, wherein M is a positive integer;
   a first demodulation unit, configured to demodulate the reliable bits of each path of data according to the modulation manner used to demodulate the reliable bits of each path of data; and
   a second demodulation unit, configured to demodulate residual bits in each path of data except the reliable bits according to a maximal likelihood ML algorithm;
   wherein the determining unit is configured to:
      determine a signal to interference and noise ratio SINR of each path of data;
      determine a modulation manner corresponding to the SINR of each path of data according to signal to noise ratio SNR thresholds corresponding to modulation manners of different orders respectively, and the SINR of each path of data and
      determine, according to the modulation manner corresponding to the SINR of each path of data, the number of reliable bits of each path of data and the modulation manner used to demodulate the reliable bits of each path of data
   wherein the determining unit is configured to:
      determine an order, which needs to be reduced, of the modulation manner corresponding to the SINR of each path of data according to the SINR of each path of data and an SNR threshold which corresponds to the modulation manner corresponding to the SINR of each path of data;

perform order reduction for the modulation manner corresponding to each path of data according to the order which needs to be reduced;

determine the number of bits modulated in an order-reduced modulation manner corresponding to the SINR of each path of data as the number of the reliable bits of each path of data; and determine the order-reduced modulation manner corresponding to the SINR of each path of data as the modulation manner used to demodulate the reliable bits of each path of data.

20. The device according to claim 14, wherein the determining unit is configured to:

determine the number of reliable bits of each path of data in an I path of a constellation diagram and a modulation manner used to demodulate the reliable bits of each path of data in the I path; and determine the number of reliable bits of each path of data in a Q path of the constellation diagram and a modulation manner used to demodulate the reliable bits of each path of data in the Q path.

21. The device according to claim 20, wherein the determining unit is configured to:

determine a real part of each path of data; and determine, according to the real part of each path of data and maximum amplitude values, corresponding to modulation manners of different orders, in the constellation diagram, the number of the reliable bits of each path of data in the I path and the modulation manner used to demodulate the reliable bits of each path of data in the I path.

22. The device according to claim 21, wherein the determining unit is configured to:

for any $h^{th}$ path of data, if a maximum amplitude value, corresponding to a modulation manner of which an order is $2^i$, in a constellation diagram≤a real part $A_I$ of the $h^{th}$ path of data<a maximum amplitude value, corresponding to a modulation manner of which an order is $2^{i+2}$, in the constellation diagram, determine that the number of reliable bits of the $h^{th}$ path of data in the I path is i/2, and determine that a modulation manner used to demodulate the reliable bits of the $h^{th}$ path of data in the I path is the modulation manner of which the order is $2^i$, wherein i is an even number greater than or equal to 2, h is a positive integer, and 1≤h≤M.

23. The device according to claim 20, wherein the determining unit is configured to:

determine an imaginary part of each path of data; and determine, according to the imaginary part of each path of data and the maximum amplitude values, corresponding to the modulation manners of different orders, in the constellation diagram, the number of the reliable bits of each path of data in the Q path and the modulation manner used to demodulate the reliable bits of each path of data in the Q path.

24. The device according to claim 23, wherein the determining unit is configured to:

for any $k^{th}$ path of data, if a maximum amplitude value, corresponding to a modulation manner of which an order is $2^n$, in the constellation diagram≤a real part $A_Q$ of the $k^{th}$ path of data<a maximum amplitude value, corresponding to a modulation manner of which an order is $2^{n+2}$, in the constellation diagram, determine that the number of reliable bits of the $k^{th}$ path of data in the Q path is n/2, and determine that a modulation manner used to demodulate the reliable bits of the $k^{th}$ path of data in the Q path is the modulation manner of which the order is $2^n$, wherein n is an even number greater than or equal to 2, k is a positive integer, and 1≤k≤M.

25. The device according to claim 20, wherein the first demodulation unit is configured to:

demodulate the reliable bits of each path of data in the I path according to the modulation manner used to demodulate the reliable bits of each path of data in the I path: and demodulate the reliable bits of each path of data in the Q path according to the modulation manner corresponding to the reliable bits of each path of data in the Q path.

26. The device according to claim 14, wherein the modulation manner is a quadrature amplitude modulation QAM manner.

\* \* \* \* \*